United States Patent
Rogers

(10) Patent No.: US 10,569,818 B2
(45) Date of Patent: Feb. 25, 2020

(54) SINGLE WHEELED TRANSPORTER

(71) Applicant: Joshua Dewain Rogers, Bentonville, AR (US)

(72) Inventor: Joshua Dewain Rogers, Bentonville, AR (US)

( * ) Notice: Subject to any disclaimer, the term of this patent is extended or adjusted under 35 U.S.C. 154(b) by 99 days.

(21) Appl. No.: 15/453,147

(22) Filed: Mar. 8, 2017

(65) Prior Publication Data

US 2017/0259878 A1 Sep. 14, 2017

Related U.S. Application Data

(60) Provisional application No. 62/389,774, filed on Mar. 9, 2016.

(51) Int. Cl.
*B62M 1/38* (2013.01)
*B62J 11/00* (2020.01)
*B62K 1/00* (2006.01)
*B62K 21/12* (2006.01)
*B62J 25/00* (2020.01)

(52) U.S. Cl.
CPC ............... *B62J 11/00* (2013.01); *B62J 25/00* (2013.01); *B62K 1/00* (2013.01); *B62K 21/12* (2013.01)

(58) Field of Classification Search
CPC .................................. B62K 1/00; B62K 21/12
See application file for complete search history.

(56) References Cited

U.S. PATENT DOCUMENTS

| | | |
|---|---|---|
| 4,055,354 A | 10/1977 | Sharpe |
| 4,444,405 A | 4/1984 | Barrus |
| 5,106,108 A | 4/1992 | Howell |
| 5,193,832 A | 3/1993 | Wilson |
| 5,385,355 A | 1/1995 | Travois |
| 5,511,802 A * | 4/1996 | Aitken .................... B62B 5/068 280/1.5 |
| 5,884,920 A * | 3/1999 | Seto .......................... B62B 7/02 280/1.5 |
| 6,361,063 B1 | 3/2002 | Daeschner |
| 6,736,417 B1 | 5/2004 | Whitmire |
| 6,863,292 B1 | 3/2005 | Paasch |
| 7,322,584 B1 | 1/2008 | Parker |

(Continued)

FOREIGN PATENT DOCUMENTS

| | | |
|---|---|---|
| EP | 1582433 B1 | 7/2007 |
| GB | 2245871 A | 1/1992 |

(Continued)

OTHER PUBLICATIONS

Emilie H Steiff Push-A-Long Flinko https://www.pinterest.com/pin/379006124863885620/.

*Primary Examiner* — Jacob D Knutson

(74) *Attorney, Agent, or Firm* — James L. Neal

(57) ABSTRACT

A vehicle for a standing rider has a single surface-engaging wheel; a pair of foot supports, one on each side of the wheel, for supporting a standing rider astride the wheel in a position facing forward; a frame that mounts the wheel and forms a forward riser extending up and forward from the wheel to a position to be grasped by a rider standing on the foot supports to enable the rider to achieve balance and stability while standing and riding. A rearward riser extends up and rearward of the wheel to a position to be grasped by a pusher to enable the pusher to advance, balance and guide the vehicle.

20 Claims, 11 Drawing Sheets

(56) References Cited

U.S. PATENT DOCUMENTS

| | | | |
|---|---|---|---|
| 7,364,143 B2 | 4/2008 | Chen | |
| 8,467,941 B2* | 6/2013 | Field | B60N 2/045 |
| | | | 180/167 |
| 9,194,456 B2 | 11/2015 | Laird et al. | |
| 9,216,791 B2 | 12/2015 | Hudec | |
| 2011/0067937 A1* | 3/2011 | Gomi | B60B 19/003 |
| | | | 180/21 |
| 2012/0239284 A1* | 9/2012 | Field | B60N 2/045 |
| | | | 701/124 |
| 2016/0332654 A1* | 11/2016 | Langham | B62B 7/02 |

FOREIGN PATENT DOCUMENTS

| | | | |
|---|---|---|---|
| GB | 2520534 A | 5/2015 | |
| ZA | 200804224 A | 11/2009 | |

\* cited by examiner

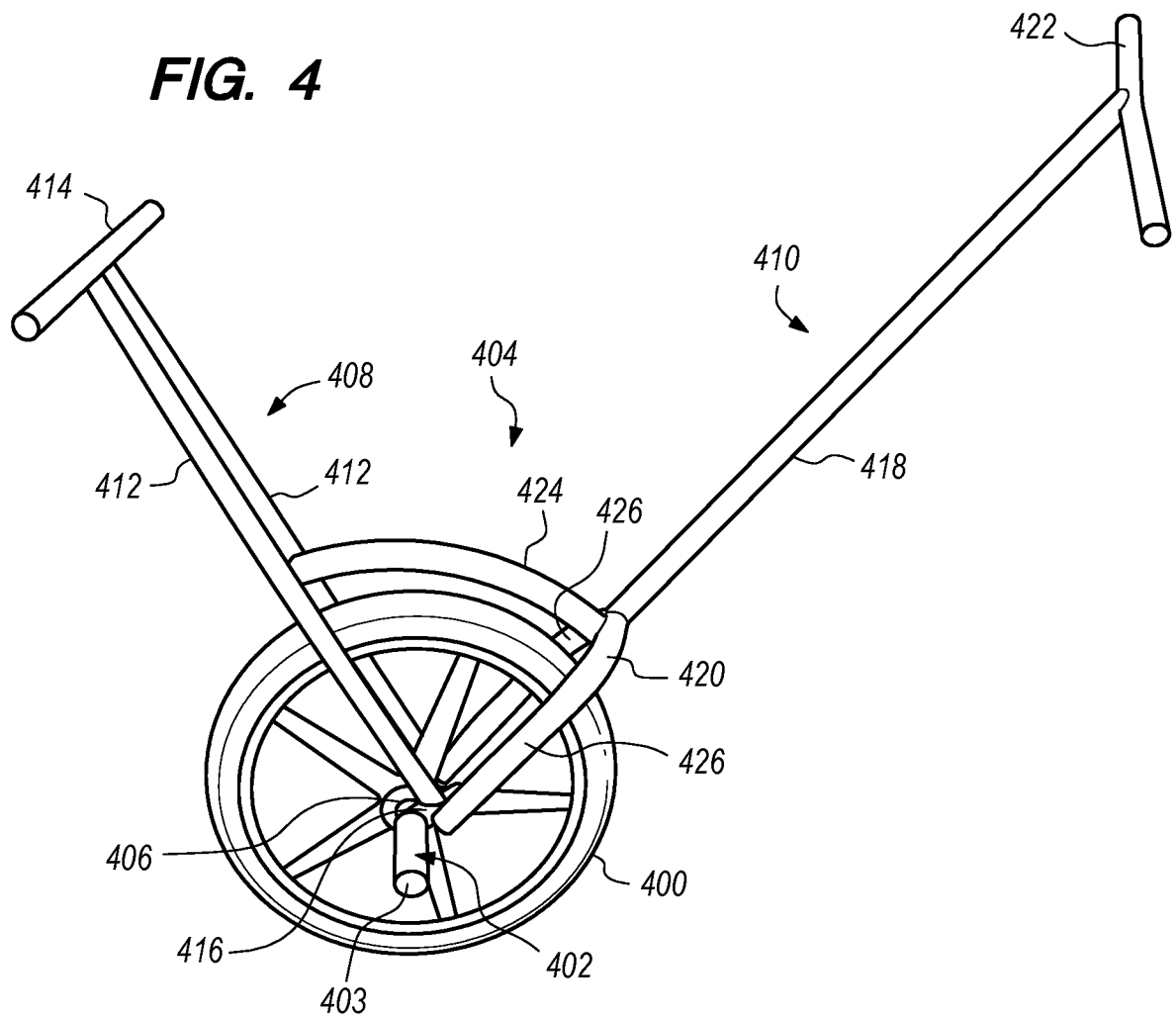

SINGLE WHEELED TRANSPORTER

BACKGROUND

Transporters pulled or pushed by a person running, walking or jogging are used for carrying inanimate loads and human passengers. These are in various configurations, each of which focuses on particular uses and offers particular advantages. Transporters operated by a person on foot often have a single axle with either two wheels or one. Two wheeled configurations are exemplified by carriers intended for the infirm and small children. The popularity of walking, hiking, jogging and running makes one wheeled devices useful due to, at least in part, their maneuverability.

For example, a single wheeled portage device exemplified by U.S. Pat. No. 4,444,405 situates a carrier above and across a single wheel. Handles fore and aft accommodate two operators, one in a pulling position and the other in a position to push. Another single wheeled device with a similarly situated load carrier, illustrated by U.S. Pat. No. 6,361,063, is adapted to be pushed by one person. Transporters of similar types are adapted for human passengers. In one described by U.S. Pat. No. 6,361,063 a chair for an infirm passenger is mounted over a single wheel. One set of handles extends forward and a second set of handles extends rearward so the passenger can be transported by two persons, one in front and one behind. Another example of a human transporter is described in U.S. Pat. No. 5,884,920. A seat for a small child is mounted above and across a single wheel and a single handle extends outward from the hub of the wheel to a bar positioned to be gripped by a pusher.

SUMMARY OF THE INVENTION

This invention relates to a vehicle for transporting a human passenger in a standing position that is pushed by a person on foot walking, hiking, jogging, running or otherwise ambulating. (As used herein any form of the words "ambulate" or "ambulating" refers to and includes walking, hiking, jogging, running and otherwise traveling on foot.) The transporter is highly maneuverable and capable of being balanced by an ambulating pusher. The device accommodates the relatively higher center of gravity of the standing passenger (as opposed to a seated passenger) and allows the person on foot to compensate for movement of the passenger while being transported. The device includes a single wheel and a connected handle in the form of a handlebar for pushing and steering. The handlebar may be connected at or near the axis of the wheel by a riser so that the handlebar is rearward of the axis (relative to the direction of push) at a convenient height for the operator. The connection can be similar in nature to that by which a bicycle fork is connected to the front wheel of a bicycle. The wheel, riser and handlebar form an operator portion of the device. The passenger portion of the device positions the passenger astride the wheel, over the axis of the wheel via a bilateral foot support. A second riser and a handle are mounted so that the handle, in the form of handlebar, is forward of the axis of rotation of the wheel at a convenient height for the passenger, the passenger being situated between the operator handlebar and the passenger handlebar. In one configuration the overall dimensions of the passenger riser and handlebar are smaller than the overall dimensions of the operator riser and handlebar. That is, a triangle formed by the lateral extent of the passenger handlebar and the hub of the wheel is smaller than a triangle formed by the lateral extent of the operator handlebar and the hub of the wheel.

In use the rider (i.e.: passenger) stands on the bilateral foot support, straddling the wheel, one foot supported on each side of the wheel, and engages the passenger handlebar primarily for balance, substantially all of the weight of the passenger being supported by the bilateral foot support. The pusher (i.e.: operator, person on foot) grips the operator handlebar and moves forward. The pusher transmits forward motion, balance and steering through the operator handlebar. The rider uses the passenger handlebar for balance and stability. Also, the rider by skill, lack of skill, intentionally or unintentionally may contribute to or detract from the balance and steering provided by the pusher through forces transmitted by the rider through the passenger handlebar and foot support. The operator riser may be longer than the passenger riser and the operator handlebar may be wider than the passenger handlebar. By this configuration the pusher can feel and readily overcome or compensate for the motion of the rider standing on the bilateral foot support. Movement of the rider is sensed and compensated for by the pusher through the forward and aft riser and handlebar configuration. The forces of forward motion, balance and steering are transmitted to the ground through the wheel and the connected framework that is formed by the larger aft riser and handlebar used by the pusher and the smaller forward riser and handlebar used by the rider.

The invention encompasses but is not limited to the following examples:

1. A vehicle comprises a wheel, bilateral foot supports for positioning a standing rider astride the wheel, a rigid frame operatively connecting the wheel and the foot supports and so configured that a rider may engage the frame for stability and balance and an operator may engage the frame to move, balance and steer the vehicle.

2. A single wheeled vehicle for transporting a standing passenger comprises:
   (a) a frame;
   (b) a ground engaging wheel having a hub by which the wheel is operatively mounted on the frame;
   (c) means by which an operator may engage the frame and advance the vehicle in a forward direction;
   (d) a foot support for a standing rider having a pair of foot supporting elements, one foot supporting element being situated on each side of the wheel; and
   (e) means by which a rider may engage the frame for maintaining stability and balance while riding.

3. A single wheeled vehicle for transporting a standing rider has shock absorbing means interposed between the wheel and foot supports for the rider for cushioning the ride of a rider standing on the foot supports.

4. A single wheeled vehicle transports a standing passenger wherein: (a) an operator may engage a frame having a riser by which the operator may advance the vehicle forward, the riser extending from a location substantially at the axis of rotation of a wheel to position an operator handle rearward of the axis of rotation of the wheel; and (b) the frame has a second riser extending from a location substantially at the axis of rotation of the wheel to position a passenger handle forward of the axis of rotation of the wheel for enabling a passenger standing between the two risers to achieve balance and stability while riding.

5. A single wheeled vehicle for transporting a standing passenger comprises foot supporting elements for the standing passenger which include a pair of foot supports mounted on the vehicle, one on each side of the wheel, along an axis either coaxial with or parallel to the axis of rotation of the wheel.

6. A vehicle comprises: a wheel having a central hub; a pair of foot supports one on each side of the wheel for supporting a standing rider astride the wheel in a position facing forward; a frame attached at the hub of the wheel forming a forward riser extending up and forward from a location at or near the hub of the wheel to a position to be grasped by a rider standing on the foot supports and a rearward riser extending up and rearward from a location at or near the hub of the wheel to a position to be grasped by a pusher.

7. A wheeled vehicle for transporting a standing passenger has a frame mounted upon a single wheel with a forward riser extending from the frame and supporting a rider handlebar a distance forward of the rotary axis of the wheel. A rearward riser extends from the frame and supports a pusher handlebar rearward of the rotational axis of the wheel at a greater distance from the axis than the rider handlebar, the handlebars being aligned along axes substantially parallel to the rotary axis of the wheel. The width of the pusher handlebar along its axis is greater than the width of the rider handlebar along its axis. Foot supports may be mounted on opposite sides of the frame along an axis substantially parallel to the rotational axis of wheel and closer to the axis of the wheel than to the rim of the wheel, or the foot supports may be mounted coaxially with the axis of the wheel.

8. A vehicle for a standing rider has a single ground engaging wheel with a central hub, a frame mounted at the central hub having a rearwardly inclined pusher bar for an operator on foot and a forwardly inclined rider bar for a rider standing astride the wheel between the pusher bar and the rider bar. A pair of foot supports are mounted one on each side of the vehicle for supporting a rider astride the wheel. The pusher bar is located a greater radial distance from the central hub than the rider bar. The width of the pusher bar may be greater than the width of the rider bar. The vehicle may also include a shock absorber interposed between the wheel and the frame for cushioning the ride of a rider standing on the foot supports.

9. A vehicle for a standing rider has:
   (a) a frame;
   (b) a ground engaging single wheel operatively mounted by the frame;
   (c) a first riser extending upward and rearward from the wheel for engagement by a person on foot;
   (d) a second riser extending upward and forward from the wheel for engagement by a standing rider; and
   (e) foot supports, one positioned on each side of the wheel, for supporting a standing rider astride the wheel;
   (f) the frame, wheel, first and second risers and foot supports being arranged such that a person on foot may ambulate to transport the vehicle and a standing passenger.

10. A wheeled vehicle for a standing passenger incorporates a rigid frame adapted to be pushed forward by an ambulating operator, a ground engaging wheel operatively connected to the frame for facilitating forward movement when the frame is pushed by an operator, a pair of foot supports on the frame for supporting a standing passenger, the foot supports being situated on opposite sides of the wheel, and one or more shock absorbers interposed between the wheel and the frame for cushioning the ride of a passenger standing on the foot supports.

BRIEF DESCRIPTION OF THE DRAWINGS

FIG. 4 is a perspective view of a transporter of this invention.

DETAILED DESCRIPTION OF THE DRAWINGS

Figure 1:
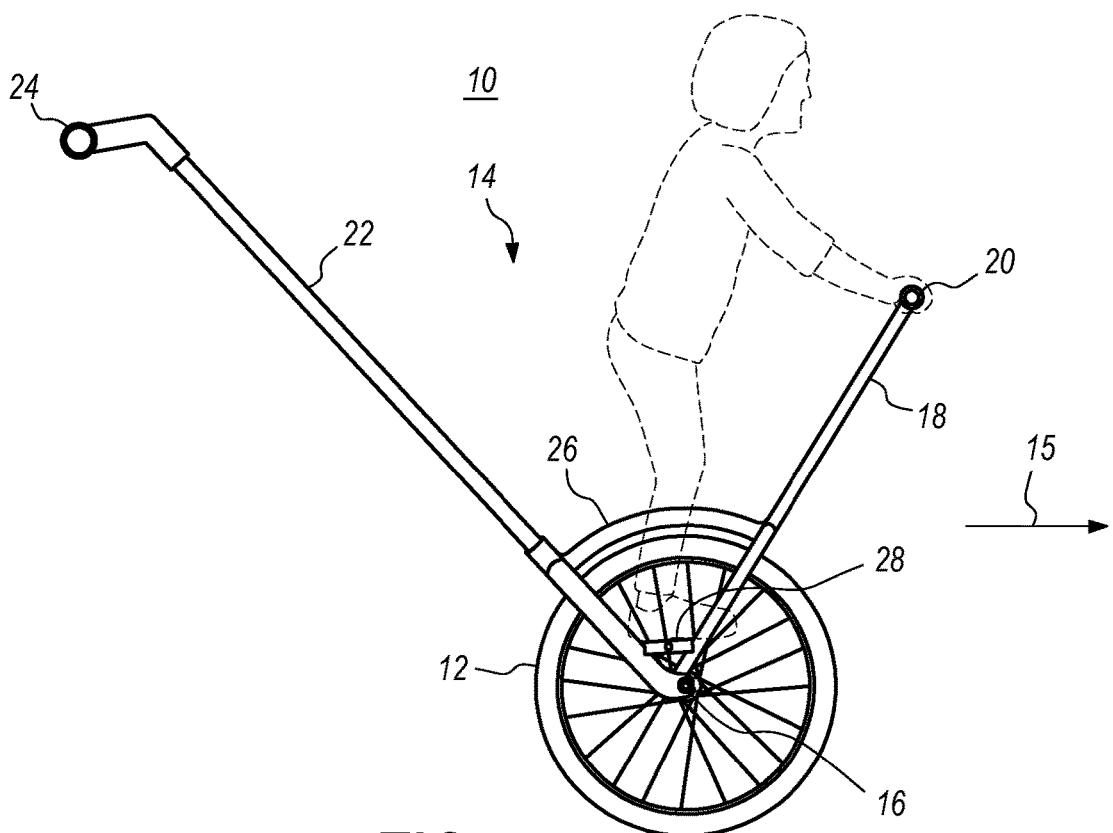
FIG. 1 is a side view showing a transporter of this invention and illustrating the position of a rider.

FIG. 1 shows a transporter 10 having a single wheel 12 connected to a rigid frame 14 at a central hub 16 formed at the rotary axis of the wheel 12. The direction of forward motion is indicated by the arrow 15. The frame 14 includes a forward riser 18 extending radially from the hub 16, handlebar 20 connected to the end of the riser 18 opposite the hub, an aft riser 22 extending radially from the hub 16 and angled rearward relative to the direction of the arrow 15, and a handlebar 24 connected to the end of the riser 22 opposite the hub. A brace 26 connects the risers 18 and 22 to fix the positions of the risers relative to each other and to increase overall rigidity of the frame 14. A rider foot support 28 is attached on each side of the frame 14 at a location substantially directly over the axis formed by the hub 16. The length of the riser 22 is greater than the length of the riser 18 and the width of the handlebar 24 along an axis parallel to the rotary axis of the wheel 12 may be greater than the width of the handlebar 20 along an axis parallel to the rotary axis of the wheel 12.

Figure 2:
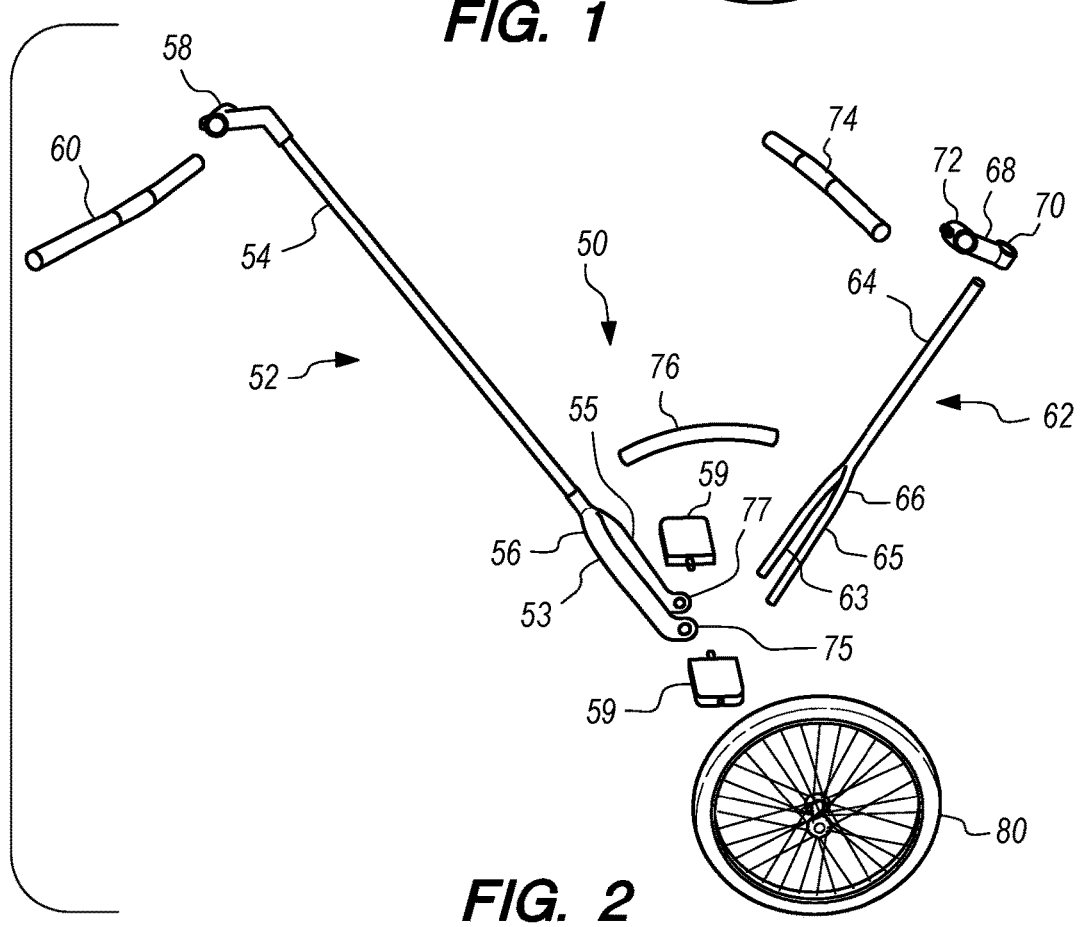
FIG. 2 is an exploded, perspective view of a transporter of this invention showing individual elements.

FIG. 2 shows the transporter with its individual elements featured; bicycle-like components are used as elements of the transporter. A bicycle-type wheel is used and a tubular frame includes bifurcated, bicycle-type forks to straddle the wheel and facilitate mounting the frame to the wheel at its hub. The rider foot platform elements are attached at the hub of the wheel.

The frame 50 has a rearwardly oriented operator riser 52 and a forwardly oriented passenger riser 62. The riser 52 includes a stem 54 extending upwardly from a fork 56. A clamp 58 at the end of the stem 54 engages and holds in place an operator handlebar 60. The riser 62 includes a stem 64 extending upwardly from a fork 66. A stem extension 68 is attached to the stem 64 at or near its end by a clamp 70 and extends rearward to mount a rider handlebar 74 in a position to be grasped by a passenger standing on foot platforms 59. The handlebar 74 is secured in place by a clamp 72. A top tube acts as a brace 76; the brace joins the riser 52 and the riser 62 and securely fixes the positions of the two risers relative to each other. The frame 50 may achieve strength and rigidity by welded joints. The depending arms 53 and 55 of the fork 56 at their end points are welded, respectively, to the end points of depending arms 63 and 65 of the fork 62. One end of the brace 76 is welded to the riser 52 where the stem 54 joins the fork 56 and the other end of the brace 76 is welded to the riser 62 where the stem 64 joins the fork 66. Connectors 75 and 77 are welded in where the forks are joined. Foot platforms 59 are attached coaxially with the wheel 80, one platform being positioned on each side of the wheel. Alternately, the foot platforms 59 may be mounted on opposite sides of the frame 50 near the location where the arms 53 and 55 are joined to the arms 63 and 65 to situate the foot platforms in close proximity to the rotary axis of the wheel 80, above, forward of, behind, or below the rotary axis of the wheel. The foot platforms may be rotating platform pedals like those used on bicycles, mounted with the axis of rotation of the pedals parallel to the axis of rotation of the wheel 80. The foot platforms 59 may also be bicycle or BMX pegs mounted on and coaxially with the rotary axis of the wheel 80 in the manner described below in more detail in connection with FIG. 4.

The wheel 80 is mounted on the frame 50 by placing the wheel between the arms of the forks 56 and 66, inserting ends of the axle of the wheel 80 into the connectors 75 and 77 and securing the axle in place with bolts (not shown). With this construction various sizes of wheels can be easily interchanged to optimize the transporter to various terrains and various sized passengers. It is understood that the transporter, being for standing passengers, is not for infants and small toddlers but is optimized for those who have achieved the ability to stand and balance.

The device of FIG. 2, as referenced above, can be constructed using some of the same or similar parts that are used for bicycles. The following sources are identified by way of example, not to indicate or imply the identified source or any particular part is required or exclusively suitable. The rider handlebar 74 can be a 45 cm. wide mountain bike flat handlebar of a type available from Origin8. The operator or pusher handlebar 60 can be a mountain bike riser handlebar about 65 cm. wide of a type available from Easton Cycling. The rider stem extension 68 can be a handlebar stem of a type available from Ritchey and exemplified by SKU: RI-PRD14533. The operator stem extension 58 could be of a quill type available from Nitto Technomic and exemplified by SKU QBP-SM1151. The foot platform 59 can be pedals of a type available from Kore exemplified by pedals under the name Rivera Thermo which have a nylon body and steel axle. The foot platform can also be a pair of stunt pegs of the type referenced below in connection with FIG. 4. The forks 56 and 66 can be of a type available from SunLite and exemplified by the SunLite Cruiser Fork 24. The wheel 80 can be a wheel of a type available from Wheel Master; for example a 24"×2.125" wheel, with a suitable tire, for example one like or similar to Kenda, model K52. The tubular metal parts such as stems 54 and 64 and brace 76 can be made of a suitable steel or other alloy tubing. For example tubular metal parts can be DOM (drawn over mandrel) mild steel tubing, A513 Type 5, available from OnlineMetals.com.

Figure 3:
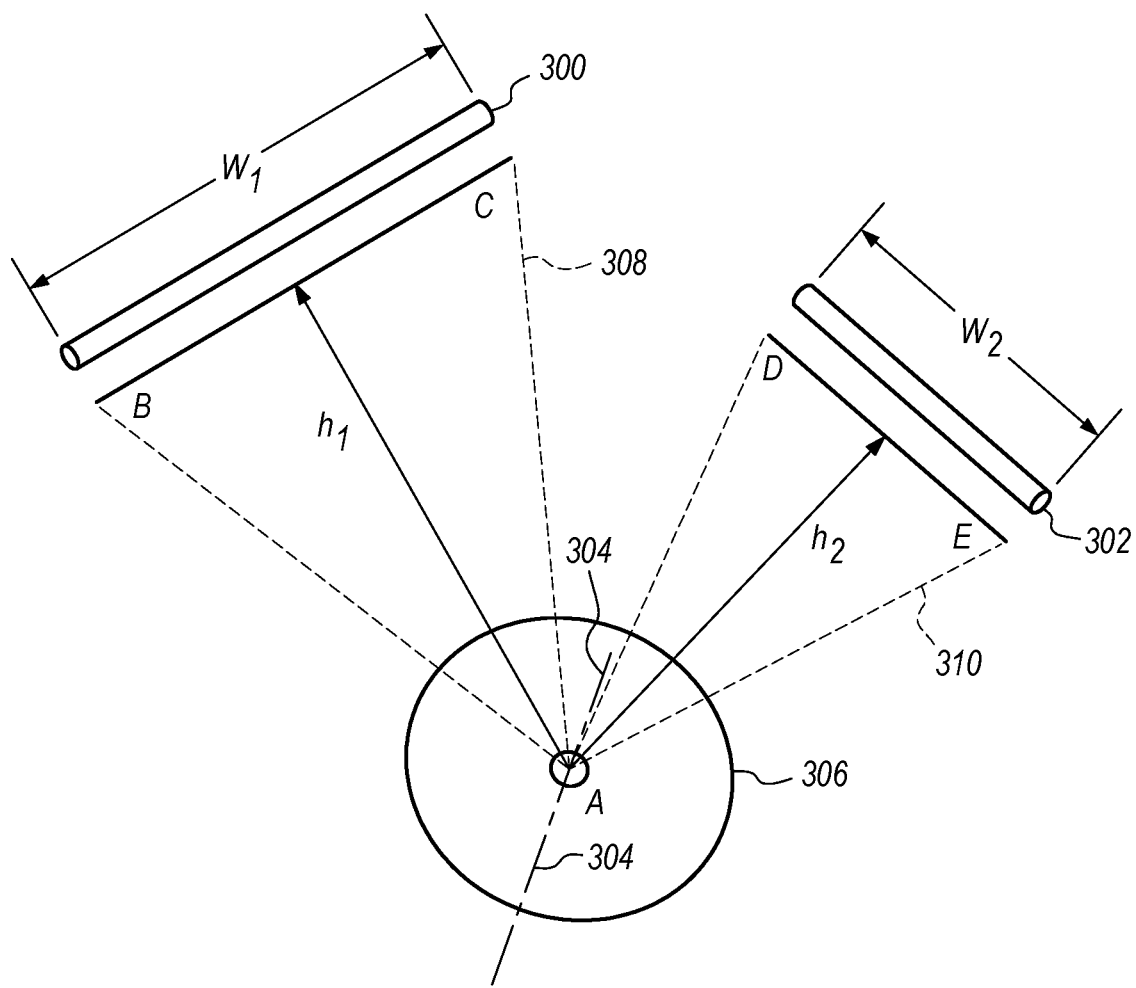
FIG. 3 is a diagrammatic view of the transporter showing certain proportional relationships of the elements.

FIG. 3 is a diagram illustrating the relative size and proportions of handlebar and riser configurations that may be characteristic of the transporter. The operator handlebar 300 (also represented by the line BC) and the hub or rotary axis of the wheel form an acute isosceles triangle 308 (triangle ABC) indicated by dashed lines. The wheel is indicated diagrammatically by the representation of a plane 306 in which the wheel rotates. The hub of the wheel is indicated diagrammatically by point A on the axis of rotation 304 of the wheel. Point A is located where the axis of rotation 304 intersects the plane 306. The height (h1) of the triangle ABC would normally be greater than its width (w1). The passenger handlebar 302 (also represented by line DE) and the hub of the wheel (point A on the axis of rotation 304) form an isosceles triangle, or possibly an equilateral triangle, 310 (triangle ADE) indicated by dashed lines. The area encompassed by the triangle ADE is smaller than the area encompassed by the triangle ABC. Specifically, the height (h1) of the operator associated triangle ABC is greater than the height (h2) of the passenger associated triangle ADE. Referencing the device of FIG. 2, the width of the handlebar 60 for the operator (or the width between grips for the operator's hands) is greater than the width of the handlebar 74 for the passenger (or the width between grips for the passenger's hands) in the same manner that, referring to FIG. 3, the width (w1) of the operator associated triangle ABC is greater than the width (w2) of the passenger associated triangle ADE. This dimensional relationship is not necessarily the case in every transporter. For example, the transporter described below in connection with FIG. 4, the widths (w1) and (w2) of the handlebars 414 and 422 are substantially equal; but the length of the riser 410 (corresponding to height (h1) of triangle ABC in FIG. 3) is substantially longer than the length of the riser 408 (corresponding to height (h2) of triangle ADE in FIG. 3). Referring yet again to FIG. 3, the widths (w1) and (w2) of the triangles ABC and ADE can be defined by the widths of the handlebars 300 and 302. Similarly, the heights (h1) and (h2) of the triangles ABC and ADE are defined, respectively, by the radial distances between the axis of rotation 304 (point A) and the handlebars 300 (BC) and 302 (DE). That is, the height (h1) of the triangle ABC is the radial distance of the handlebar 300 from the axis of rotation 304 and height (h2) of the triangle ADE is the radial distance of the handlebar 302 from the axis 304. The height (h1) of the triangle ABC is longer than the height (h2) of the triangle ADE. This accommodates a person pushing, who is anticipated to be larger than the person riding, and enables the person pushing to have more leverage over dynamic forces than the person riding. In a transporter utilizing an open wheel without a physical hub (as well as one with more conventional wheels having a hub and spokes) the locus the of point A of the triangles ABC and ADE, as indicated by FIG. 3, would be the locus where the axis of rotation 304 of the hubless wheel intersects the plane 306 in which the hubless wheel spins.

Figure 4A:
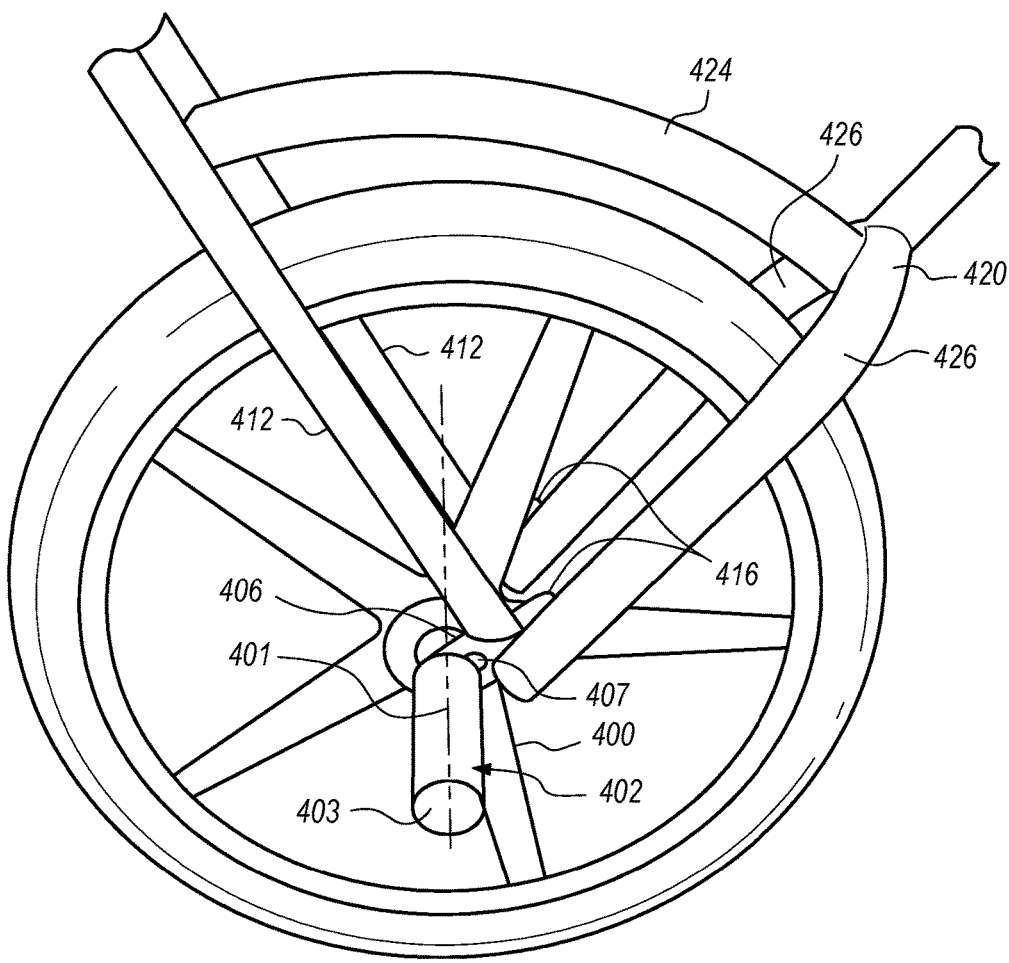
FIG. 4A is an enlarged perspective view showing a portion of the transporter of FIG. 4.
Figure 4B:
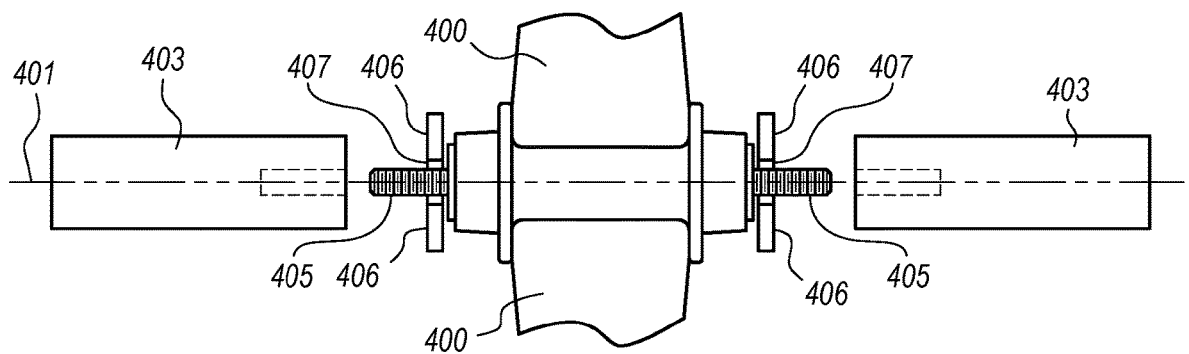
FIG. 4B is a break-away plan view of FIG. 4A.

FIGS. 4, 4A and 4B show a transporter in which a rigid-spoked wheel 400 is mounted on a frame 404 with a pair of foot supporting elements 402 on an extended axle 405 of the wheel. The frame 404 includes a pair of drop-out connectors 406 which extend downward from two mounting plates 416. The drop-out connectors 406 are situated to be positioned one on one side of the wheel 400 and the other on the other side of the wheel. Opposite ends of the wheel axle 405 are mounted within opposing slots 407 in the two drop-out connectors 406. The frame 404 has a riser 408 for the rider and a longer riser 410 for the pusher. The riser 408 is bifurcated, formed of two tubular leg elements 412 joined at one end in a bifurcated "V" shape with the point of the "V" connected to the rider handle 414 by a clamp, a weld or the like. At the open end of the "V" configuration the second ends of the leg elements 412 straddle the wheel 400 and are welded one on each side of the wheel to the mounting plates 416. The riser 410 has a tubular stem 418 joined at one end to a handle 422 and at the other end to a tubular bifurcated fork 420 which may be a conventional bicycle-type fork. The legs 426 of the fork 420 straddle the wheel 400 and the ends of the legs 426 opposite the stem 418 are welded to the mounting plates 416 near the site where the leg elements 412 are connected to the mounting plates 416. The handles 414 and 422 may be approximately the same width (as shown) or the handle 422 may be longer. A tubular brace 424 is welded at one end to the riser 410 at the junction of the fork 420 and the stem 418. The other end of the brace 424 extends to a space between the leg elements 412 of the riser 408 and is welded to and between both leg elements. The brace 424 is shown just above the wheel 400 and following the line of the circumference of the wheel. This location of the brace 424 increases the rigidity of the frame 404 while minimizing any interference between the brace and the rider. The brace 424 also serves as a shield for the wheel 400 to protect the rider from the wheel.

Viewing FIGS. 4A and 4B, the foot support elements 402 are cylindrical pegs 403 mounted on threaded opposing ends of the extended axle 405, coaxially with the axis of rotation 401 of the wheel 400, one peg on each side of the wheel. The mounted pegs 403 project axially outward from both sides of the wheel. Cylindrical pegs 403 may be a pair of bicycle or BMX stunt pegs of the types available under such brand names as Odyssey, Black Ops and Haro. The pegs 403 could, for example, be like or similar to Black Ops axle pegs or Black Ops lead foot BMX pegs. Alternately, the pegs may be like that exemplified by U.S. Pat. No. 6,863,292 to Paasch which is incorporated herein by reference.

Figure 5:
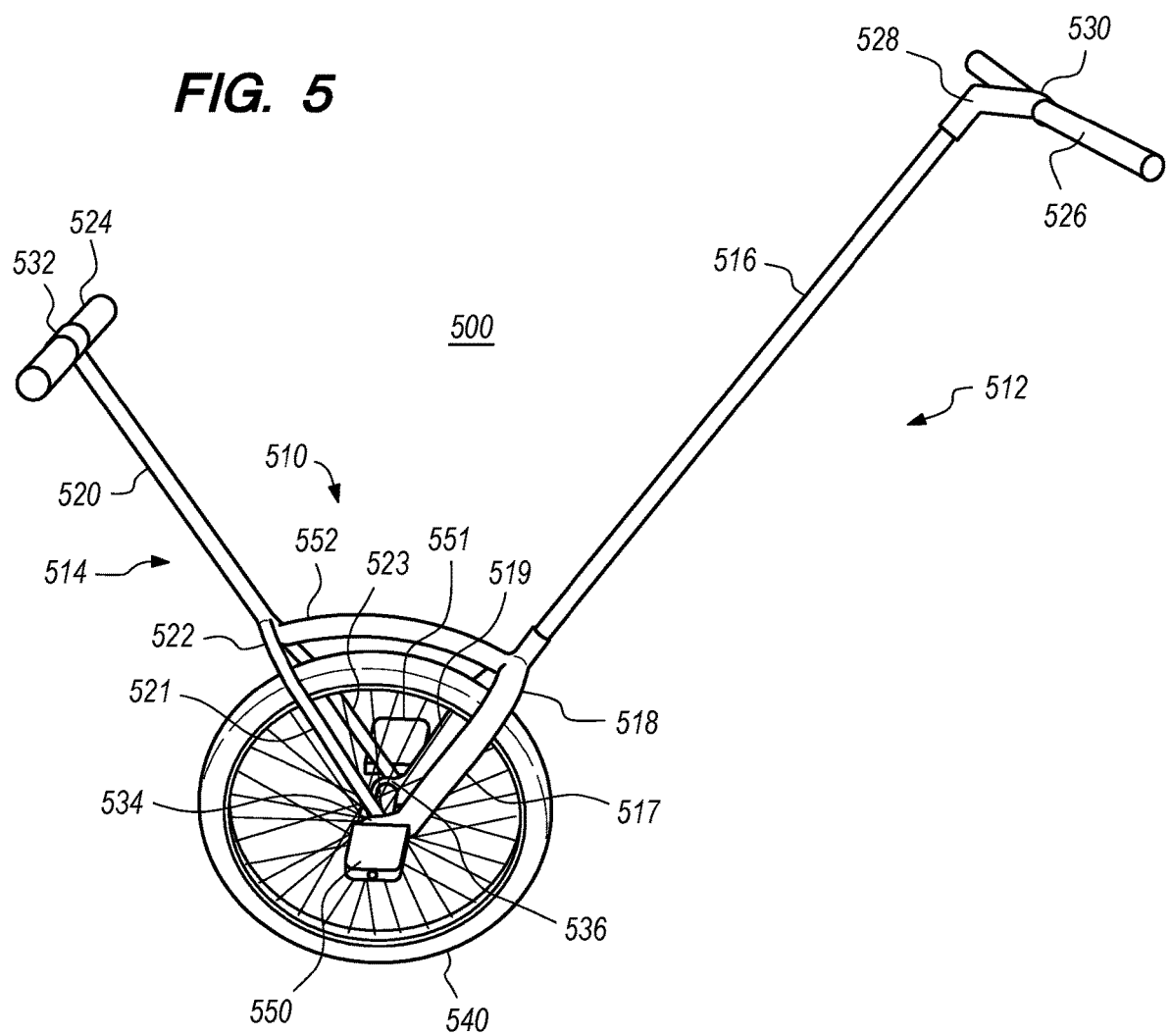
FIG. 5 is a perspective view of a transporter of the invention.
Figure 5A:
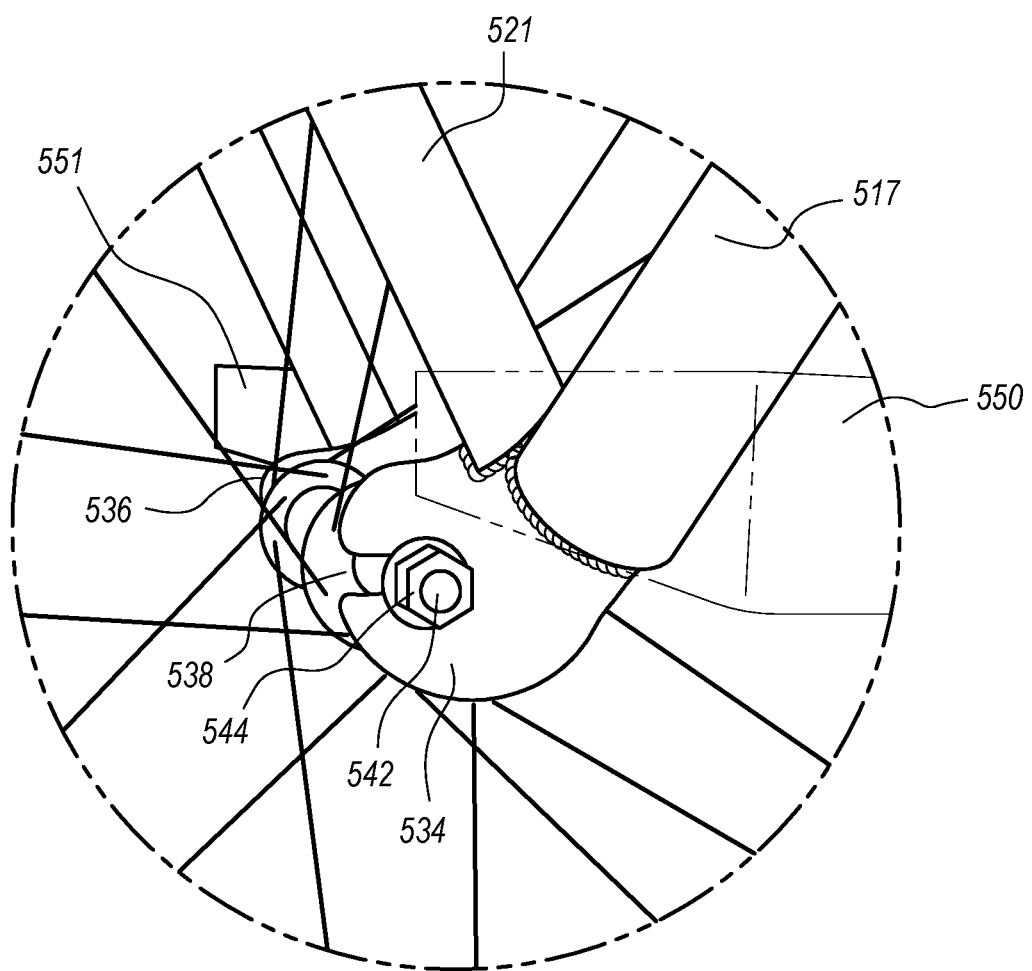
FIG. 5A is an enlarged perspective view showing a portion of the transporter of FIG. 5.

FIGS. 5 and 5A show a transporter 500. In FIG. 5 a frame 510 incorporates an operator riser 512 and a passenger riser 514. The operator riser 512 has a straight stem 516 which extends from the closed end of a fork 518 and is connected to a bicycle -type handlebar 526 at the end opposite the fork 518. A stem extender 528 extends rearward from that opposite end of the stem 516 and connects to the handlebar 526 by means of a pinch type clamp 530. The passenger riser 514 has a straight stem 520 that is shorter than the stem 516 and is connected to a handlebar 524 by means of a pinch type clamp 532. The handlebars 524 and 526 are oriented along axes that are substantially parallel to the axis of rotation of the wheel 540 and the width of handlebar 526 along its axis is greater than the width of handlebar 524 along its axis. Handlebars of the type suitable for handlebars 524 and 526 are available from Easton Cycling, Ritchey and Origin8.

As an option the height of the handlebars for both the passenger and operator may be adjustable. In FIG. 5 a handlebar stem extender 528 can be telescopically fitted to slide up and down on a stem 516. The height of the passenger handlebar 524 can be adjusted by using a bicycle handlebar mounting mechanism 532 with dual pinch-style fasteners (not shown) which pinch both the handlebar 524 and the stem 520. The handlebar 524 can be raised or lowered by loosening the pinch bolt on the stem 520, sliding the mounting mechanism 532 up or down along the stem, and retightening the stem pinch bolt. The stems 516 and 520 may also be constructed to be telescopically adjustable (not shown).

The open ends of the operator fork 518 and passenger fork 522 are connected to mounting plates 534 and 536. The fork 522 has a leg 521 adapted to be situated on one side of a bicycle-type wheel 540 and a leg 523 adapted to be situated on the opposite side of the wheel 540. Similarly, the fork 518 has a leg 517 adapted to be situated on the one side of the wheel 540 and a leg 519 adapted to be situated on the opposite side of the wheel. The mounting plates 534 and 536 are the connecting elements for the frame 510, the wheel 540 and, optionally, the pedals 550. Viewing FIG. 5A, the end of the leg 517 and the end of the leg 521 are each welded to the mounting plate 534. Similarly, the ends of the legs 519 and 523 are connected to the mounting plate 536. The mounting plates 534 and 536 each have formed therein a slot 538 open toward the forward direction of the transporter. The slots 538 constitute a drop-out connector that receives opposing ends of the axle 542 of the wheel 540. Each end of the axle 542 is threaded to receive a bolt 544. The bolts 544 are tightened to fix in place the axle 542 and wheel 540. A quick release connector (not shown) may alternately be used to fix the axle 542 in place. Referring to FIG. 5, a brace 552 connects the risers 512 and 514 to increase rigidity of the frame 510, in a manner similar to that described in connection with FIG. 4.

Bicycle-type pedals 550 and 551 are affixed one on each side of the frame 510 along an axis parallel to the rotary axis of the wheel 540. The two pedals 550 and 551 provide a foot platform and position a standing passenger over and astride the wheel 540. The pedals 550 and 551 may be mounted directly one on each of the mounting plates 534 and 536 closely adjacent the slots 538 so that when the axle 542 and wheel 540 are in place a standing passenger is centered over or substantially over the rotary axis of the wheel. Alternately, the pedals 550 and 551 may be affixed directly to the depending arms of the fork 518, or of the fork 522, with the standing passenger being over, forward or rearward of the rotary axis of the wheel, it being understood that the stability of the transporter 500 is increased as the position of the passenger approaches one directly over the rotary axis of the wheel.

With the transporter of this invention the standing passenger may be expected to be or may be encouraged to be in some degree of motion as the operator pushes the transporter forward so the position of the passenger relative to the rotary axis of the wheel can be constantly changing. The rigid frame 510 with the passenger riser 514 including handlebar 524 and the operator riser 512 including handlebar 526, and the single ground or surface engaging wheel 540 enable the passenger to achieve balanced and stable stances and enable the operator to push forward, balance and steer the transporter 500 in constantly changing dynamic circumstances. The dynamic circumstances arise from passenger movement and the terrain over which the transporter is pushed.

Figure 6:
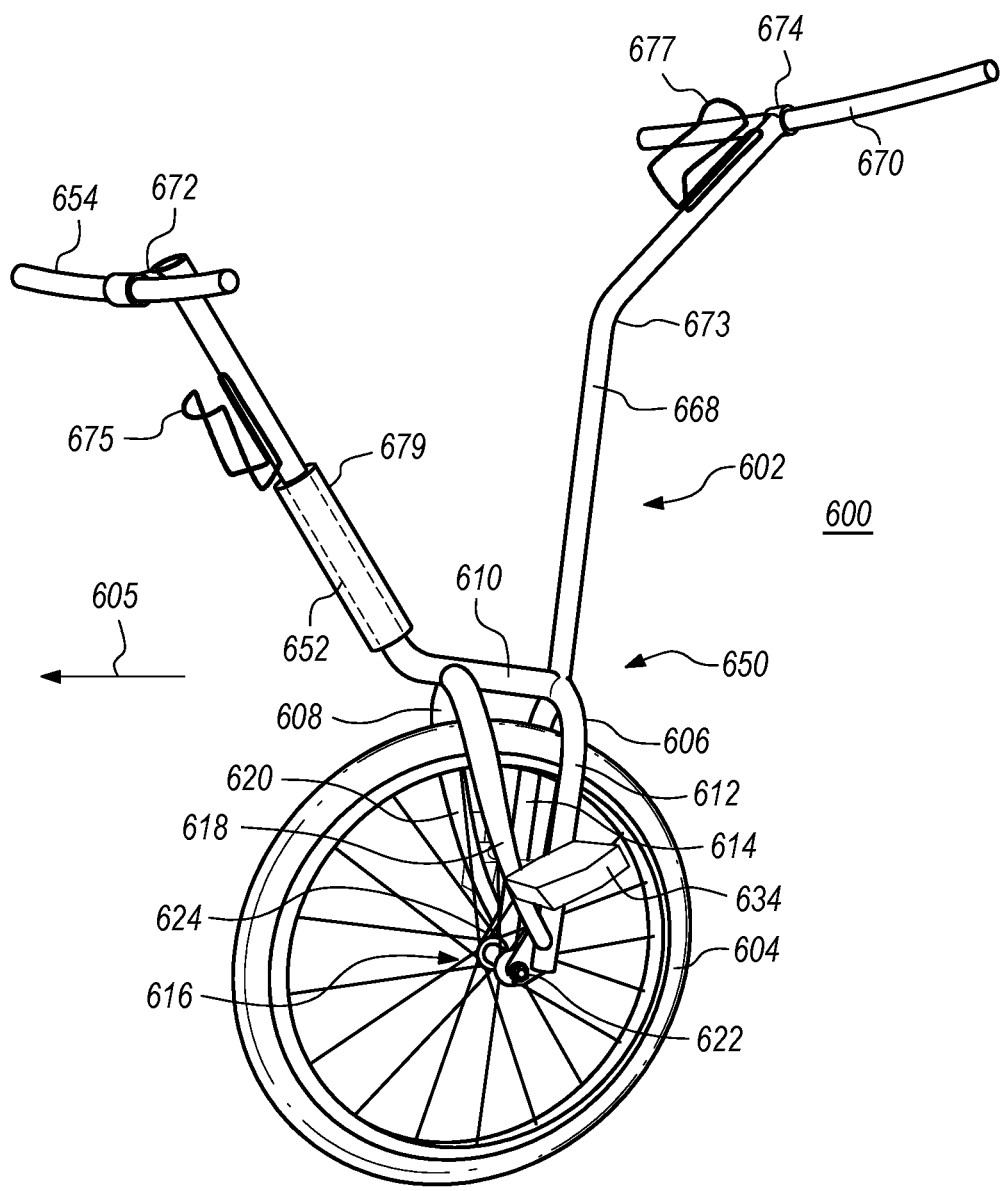
FIG. 6 is a perspective view of a transporter of the invention.
Figure 6A:
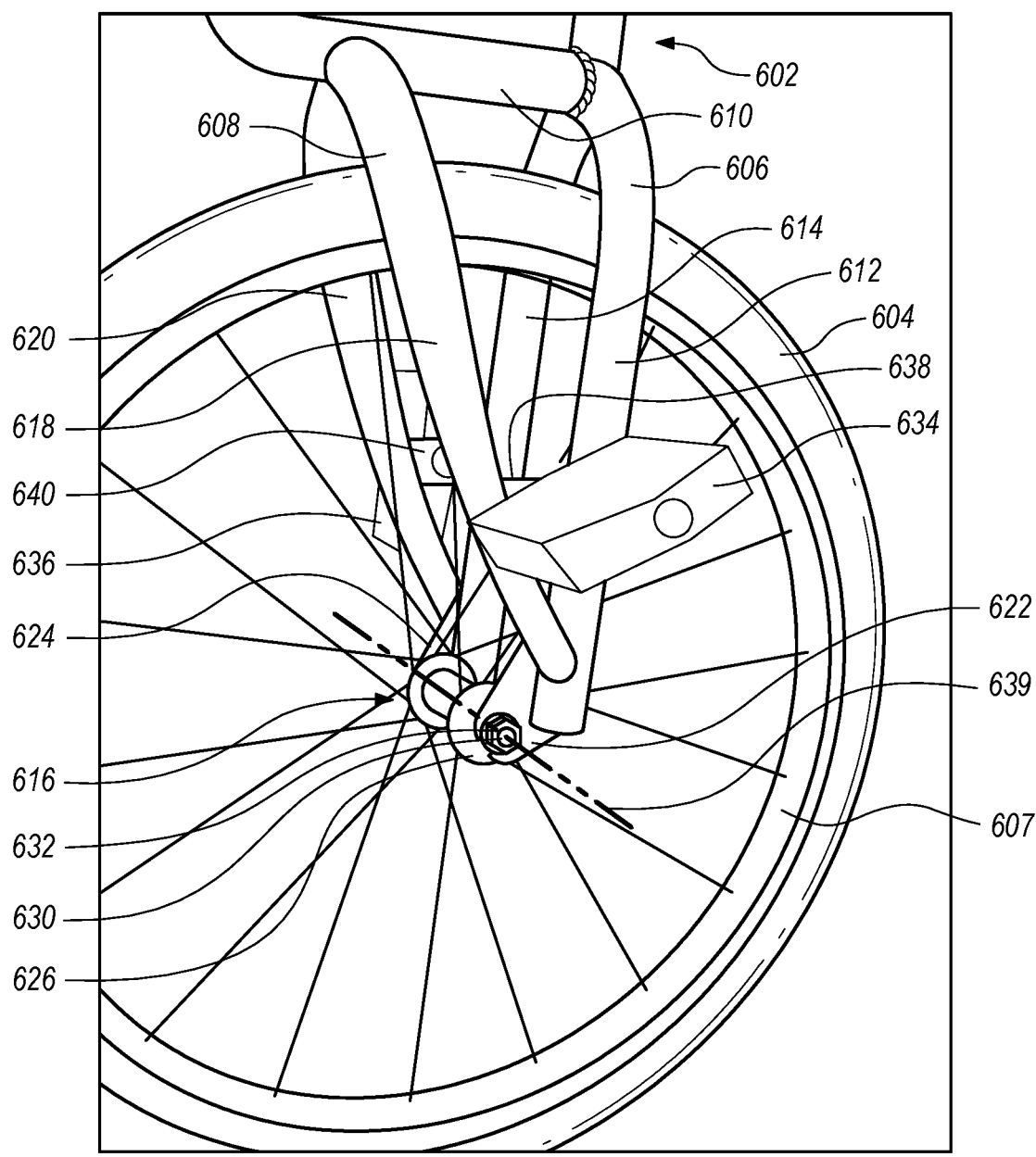
FIG. 6A is an enlarged perspective view showing a portion of the transporter of FIG. 6.

FIGS. 6 and 6A show transporter 600 which comprises a frame 602 and a single wheel 604 and is adapted to be pushed in a forward direction indicated by arrow 605. The lower, wheel engaging portion of the frame 602 incorporates two U-shaped forks 606 and 608 connected at their upper curved regions by a brace 610. Legs 612 and 614 extend downward from the upper curved portion of the fork 606 to terminate at the hub 616 of the wheel 604 and straddle the wheel 604 with the leg 612 being on a first side of the wheel and the leg 614 being on a second side of the wheel. Similarly, legs 618 and 620 extend downward from the upper curved portion of the fork 608 to terminate near the hub 616 of the wheel 604 and straddle the wheel 604 with the leg 618 being on the first side of the wheel 604 and the leg 614 being on the second side of the wheel. The terminal end of the leg 618 is welded to the leg 612 above and near the terminal end of the leg 612. In like manner the terminal end of the leg 620 is welded to the leg 614 above and near the terminal end of the leg 614. A mounting plate 622 extends in a forward orientation from the terminal ends of legs 612 and 618 and a mounting plate 624 extends in a forward orientation from the terminal ends of legs 614 and 620. Each of the mounting plates 622 and 624 incorporate a forward facing slot 626. The mounting plates 622 and 624 with the two slots 626 form a drop-out connection for receiving the axle 630 of the wheel 604. Threaded ends of the axle 630 together with bolts 632 secure the wheel 604 to the frame 602. The two forks 606 and 608, the brace 610 and the mounting plates 622 and 624 form a rigid cage structure 650 that straddles and mounts the wheel 604. The wheel 604 is connected to the frame 602 in the same manner that a bicycle front wheel is attached to the bicycle fork. The axle 630 slides into slots 626 in mounting plates 622 and is secured in the slots 626 with nuts 632 threaded onto the shaft of the axle 630. A bicycle-type quick disconnect axle retention mechanism (not shown) is also an option, as it would lend ease to disassembly for transport of the machine.

A support member 638 is welded to and between the legs 612 and 618 for mounting a bicycle-type pedal 634 substantially directly above the hub 616, the hub 616 forming the rotary axis 639 of the wheel 604. A second support member 640 is welded to and between the legs 614 and 620 for mounting a second bicycle-type pedal 636 substantially directly above the hub 616 in a position complementary to the position of pedal 634. The support members 638 and 640 each have a formed therein a female threaded nut located to receive a threaded male bolt formed on each of the pedals 634 and 636. The connections of the pedals to the support members are like or similar to the usual connections of bicycle pedals to a bicycle crank. The pedals 634 and 636 are mounted along an axis parallel to the axis of rotation 639 of the wheel 604 closer to the axis of rotation 639 than to the rim 607 of the wheel. The pedals 634 and 636 together form a stable passenger foot support on which a passenger stands while riding. In FIG. 6 the fork 608 tilts forward. In this manner the rearward shift of the frame 650 relative to the hub 616 created by the forwardly extending the mounting plates 622 and 624 is compensated for so the pedals 634 and 636 can be mounted on the supporting members 638 and 640 with the pedals located directly over or substantially over the hub 616 and its axis 639.

When navigating rough terrain it may be desirable to use a relatively large wheel. This can result in the radius of the wheel being longer than the legs of a small passenger or at least sufficiently long that a passenger would have no comfortable riding position if the pedals 634 and 636 were mounted at or near the rotary axis 639 of the wheel 604. In the transporter of FIG. 6 the location of support members 638 and 640 is such that the pedals 634 and 636 are situated radially above the hub 616; the distance of the pedals above the hub being sufficient to elevate the position of a typical passenger to a comfortable riding position.

The upper part of the frame 602 will now be described. A fore stem 652 extends upward and forward from a forward portion of the cage 650 and at its leading end mounts a passenger handlebar 654. An aft stem 668 extends upward and rearward from a rearward portion of the cage 650 and at its trailing end mounts operator handlebar 670. The handlebars 654 and 670 are held in place, respectively, by clamps 672 and 674. The lower portion of the stem 668 rises from the cage 650 with a relatively slight tilt rearward and part way along the length of the stem 668 it curves, in the region 673, to a relatively sharp tilt rearward. The curved shape of the stem 668 is such that it positions the handlebar 670 for use by an operator and also locates the operator handlebar 670 a greater radial distance from the hub 616 than the passenger handlebar 654. Items useful for the convenience of the rider and the operator may be mounted on the transporter 600. For example bottle holders 675 and 677 are mounted on stems 652 and 668. Also, elements of the frame 602 may be covered in a soft padding 679 to enhance the comfort and safety of a rider.

The transporter of FIG. 6 will be likened to the proportional relationships indicated by FIG. 3. The radial distance from the hub 616 (i.e.: the axis 639) to the handlebar 670 corresponds to the height (h1) of triangle ABC and the width of the handgrips on the handlebar 670 corresponds to the width BC of the triangle ABC. The radial distance from the hub 616 (i.e.: the axis 639) to the handlebar 654 corresponds to the height (h2) of triangle ADE and the width of the handgrips on the handlebar 654 corresponds to the width DE of the triangle ADE.

When the transporter 600 of FIG. 6 is in use a rider stands between the handlebars 654 and 670, astride the wheel 604 with a foot on each of the pedals 534 and 536, facing forward and grips the passenger handlebar 654. The pusher grips the operator handlebar 670 and moves forward. The pusher transmits forward motion, balance and steering through the operator handlebar 670, the stem 668, the cage 650 and the wheel 604. The rider uses the passenger handlebar 654, the stem 652, the cage 650 and pedals 634 and 636 for balance and stability. The rider by skill, lack of skill, intentionally or unintentionally may contribute to or detract from the balance and steering provided by the pusher through forces transmitted by the rider directly to the passenger handlebar 654 and the foot support provided by the pedals 634 and 636. The pusher can feel and readily overcome or compensate for the motion of the rider standing on the foot support and the forces imparted by the rider to the transporter 600. The forces of forward motion, balance and steering are transmitted to the ground or surface through the wheel 604 and the connected frame 602. Control by the pusher is enhanced by means of the stem 668 and handlebar 670 being, respectively, longer and wider than the stem 652 and handlebar 654. While the overall lengths and widths of the elements may vary, as explained in connection with FIG. 3, in the transporter 600 of FIG. 6 the overall area of the triangle ABC exceeds the overall area of triangle ADE.

The single wheeled transporters for standing riders shown by FIGS. 7, 7A, 8 and 8A have a shock absorber between the wheel and the rider.

Figure 7:
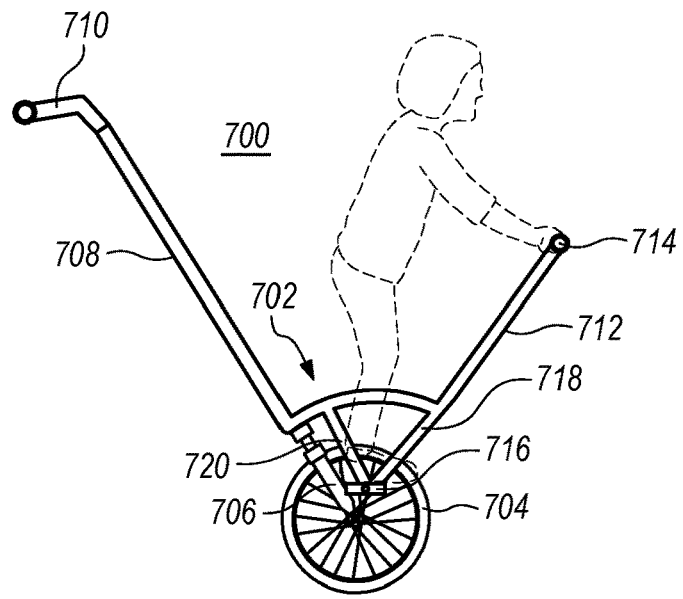
FIG. 7 is a side view of a further transporter of the invention.
Figure 7A:
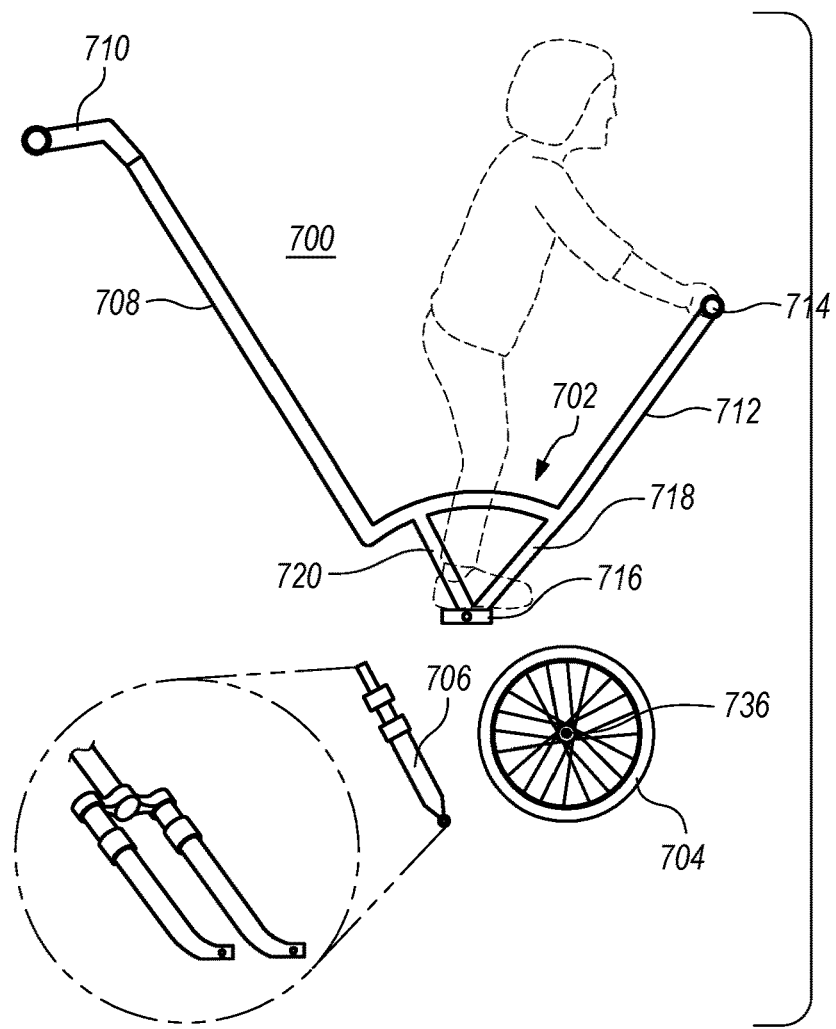
FIG. 7A is an exploded view of the transporter of FIG. 7.

The transporter 700 shown in FIG. 7 incorporates a rigid frame 702 and a wheel 704 with a shock absorbing fork assembly 706 interposed between the frame 702 and the wheel 704, the fork assembly mounting the wheel to the frame. The frame 702 includes a riser 708 and handlebar assembly 710 for the pusher and a riser 712 and handlebar 714 for the rider. The rider is supported on the transporter 700 astride the wheel 704 by a pair of foot supports 716 mounted on opposite sides of the wheel 704 by forked structures 718 and 720, the forked structures forming part of the rigid frame 702. FIG. 7A is a partially exploded view showing the transporter 700 with the frame 702, wheel 704 and shock absorbing fork assembly 706 shown individually and the fork assembly 706 shown in perspective in more detail. The shock absorbing fork assembly 706 is a conventional type of fork with a pair of arms 722 and 724. The arm 722 incorporates a shock absorbing strut assembly 726 and a connector 730. Similarly, the arm 724 incorporates the shock absorbing strut assembly 728 and the connector 732. The shock absorbing struts 726 and 728 may incorporate shock absorbing compression materials such as coiled springs, air, or resilient solid materials; also systems using a hydraulic fluid may be used. (One example of such forks is shown in U.S. Pat. No. 9,194,456 issued to Fox Factory, Inc. Another example is shown in U.S. Pat. No. 7,364,143 issued to Hui-Hsiung Chen.) The hub 736 of the wheel 704 is mounted between the arms 722 and 724 of the fork assembly 706 by the connectors 730 and 732. The fork assembly 706 is connected to the frame 702 by a shaft 734 that extends from the fork assembly 706 into the riser 708 (which is of a hollow tubular configuration) for affixing the fork assembly 706 to the frame 702 so there is no relative movement between the shaft 734 and the riser 708. In operation the rider stands on the foot supports 716 astride the wheel 704 and holds to the handlebar 714. The pusher holds the handlebar assembly 710 and ambulates forward. The greater the diameter of the wheel 704 the more easily it will pass over relatively large objects. As the wheel 704 passes over rough terrain or large objects forces encountered by the wheel, which would otherwise be transferred to the frame 702, the foot supports 716 and the rider, will be absorbed by the strut assemblies 726 and 728 to smooth the ride for the rider.

Figure 8:
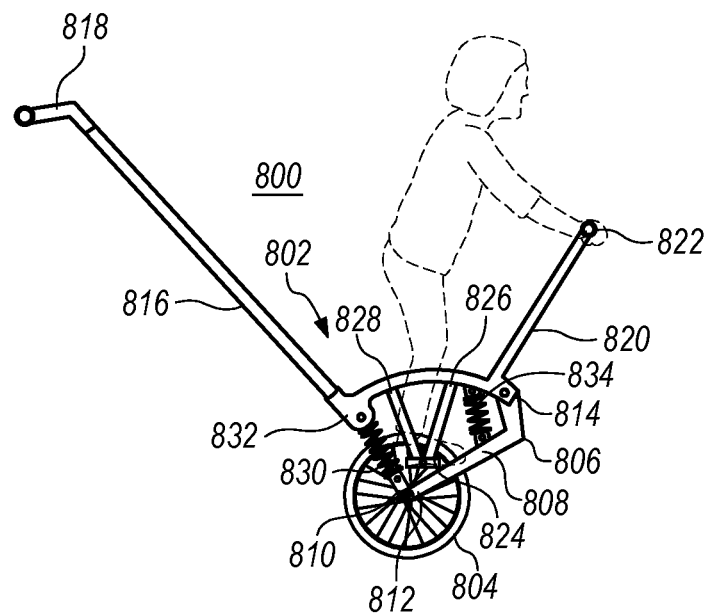
FIG. 8 is a side view of a transporter of the invention.
Figure 8A:
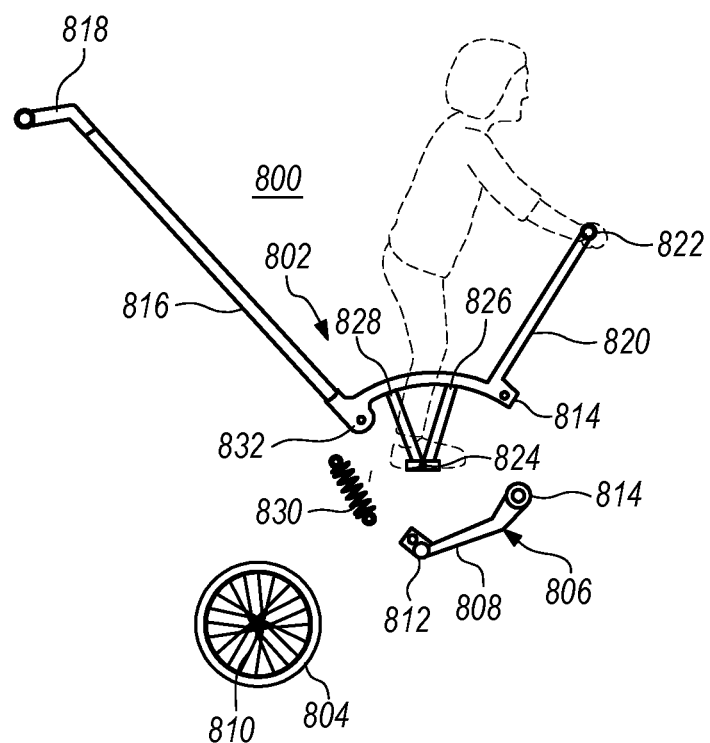
FIG. 8A is an exploded view of a transporter of the invention.

The transporter 800 of FIGS. 8 and 8A incorporates a rigid frame 802 and a wheel 804 mounted on the frame by a swing arm fork 806. The wheel is mounted between a pair of swing arms 808 with the hub 810 of the wheel attached between the swinging ends 812 of the swing arms 808. The swing arm fork 806 is connected to the frame 802 in a convenient manner as by hinged connecting elements 814, used with a nut-and-bolt or pin-type connector (not shown). The frame 802 includes a riser 816 and handlebar assembly 818 for the pusher and a riser 820 and handlebar 822 for the rider. The rider is supported on the transporter 800 astride the wheel 804 by a pair of foot supports 824 mounted on opposite sides of the wheel 804 by forked element 826 and forked element 828, forks 826 and 828 forming part of the rigid frame 802. One or more shock absorbers are located between the swing arm fork 806 and the frame 802 to cushion the ride of a passenger standing on the foot supports 824. As shown in FIGS. 8 and 8A a pair of shock absorbers 830 may be attached one on each side of the wheel 804 between the swinging ends 812 of the swing arm fork 806 and a pair of mating connecting elements 832 on the frame 802. Alternately or in addition, as indicated in FIG. 8, a single shock absorber 834 may be introduced forward of the wheel 804 between the swing arm fork 806 and the frame 802. It will be appreciated that the shock absorbing mechanism may be situated at any convenient location along the swing arm fork 2018. In operation a rider (shown in phantom) stands on the foot supports 824 astride the wheel 804 and holds to the handlebar 822. The pusher holds the handlebar assembly 818 and ambulates forward. As the wheel 804 passes over rough terrain or large objects, forces encountered by the wheel which would otherwise be transferred to the frame 802, the foot supports 824 and the rider will be absorbed by the shock absorbers 830 (and/or shock absorber 834 if that option is used) to smooth the ride for the rider.

Figure 9:
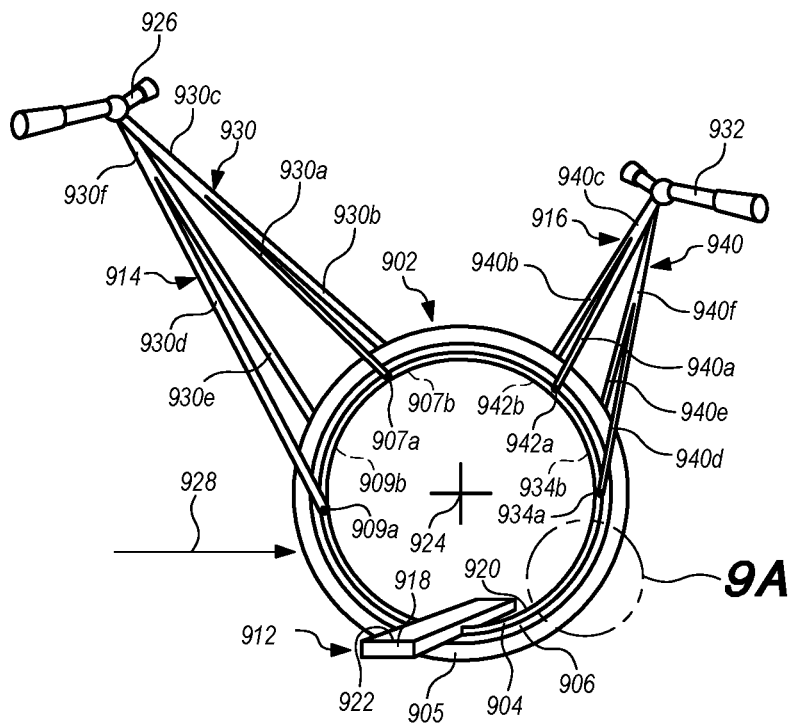
FIG. 9 shows another transporter of this invention.
Figure 9A:
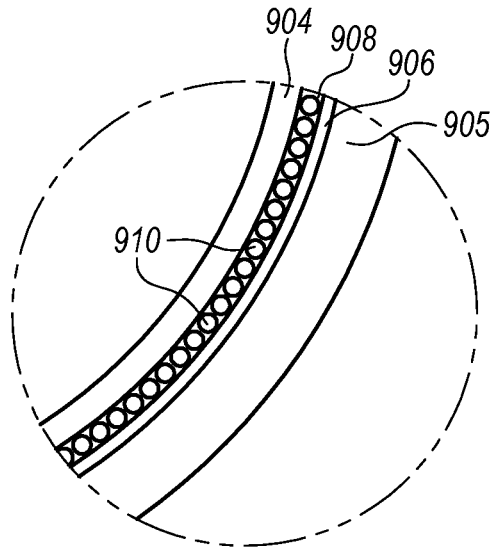
FIG. 9A is a view showing certain details of the transporter of FIG. 9.

In the transporter of FIG. 9 a transporter 900 incorporates an open single wheel 902 without a physical hub at the rotary axis 924. An inner stationary (non-rotating) rim 904 is surrounded by an outer wheel 902 having a rotary rim 906 and a tire 905. The tire 905 is mounted on outer rim 906 to make rolling contact with the surface or terrain over which the transporter is to travel and may be a conventional bicycle-type tire. The diameter of the outer rim 906 is larger than the diameter of the inner rim 904 by an amount effective to form between the inner and outer rims a ring-shaped space 908 to accommodate bearing or roller elements 910. The space 908 may be filled with roller bearings 910 as illustrated in FIG. 9 or bearings may be situated at intervals around the ring-shaped space 908 by a separator or cage (not shown). Stated in terms associated with rotary bearing structures, a stationary inner race 904 and a rotatable outer race 906 form between them a space 908 for roller bearings 910. The roller bearings 910 are held in place by the inner race 904, the outer race 906 and, optionally, a separator or cage (not shown). Any suitable friction reducing elements or surface may be used at the interface of the inner race 904 and the outer race 906.

Three assemblies are mounted on the inner rim 904 as shown by FIG. 9. These are a foot support assembly 912 affixed to the inner rim 904 for supporting a standing passenger, an operator riser assembly 914 and a passenger riser assembly 916. The foot support assembly 912 may be a standing platform 918 affixed to the inner surface 920 of the inner rim 904 and forming a surface 922 having a pair of foot supporting surfaces positioned on opposite sides of the wheel. The surface 922 is aligned substantially in parallel with the rotary axis 924 of the outer rim 906. Alternately, the foot support assembly 912 may incorporate pedals or pegs of the type illustrated in connection with other transporters described above.

The operator assembly 914 includes a handlebar 926 by which an operator may push, guide and balance the transporter 900 and advance it forward as indicated by arrow 928. The handlebar 926 is affixed to the inner rim 904 by connecting elements 930. Connecting elements 930(*a*) and 930(*b*) form a forked structure attached at a base or stem 930(*c*) to the handlebar 926. The open ends of the fork formed by the connecting elements 930(*a*) and 930(*b*) are connected to opposite sides of the stationary inner rim 904 at locations 907(*a*) and 907(*b*), locations 907(*a*) and 907(*b*) being shown at approximately the 330° position along the inner rim 904. The forked structure formed by elements 930(*a*) and 930(*b*) is shaped so as to clear the tire 905 and the rim 906 and be affixed to the opposite sides of the rim 904 at locations 907(*a*) and 907(*b*). Connecting elements 930(*d*) and 930(*e*) form a forked structure attached at the base or stem 930(*f*) to the handlebar 926. The open ends of the fork formed by the connecting elements 930(*d*) and 930(*e*) are connected to opposite sides of the stationary inner rim 904 at locations 909(*a*) and 909(*b*), locations 909(*a*) and 909(*b*) being shown at approximately the 260° position along the inner rim 904. The forked structure formed by elements 930(*d*) and 930(*e*) is shaped so as to clear the tire 905 and the rim 906 and be affixed to the opposite sides of the rim 904 at locations 909(*a*) and 909(*b*).

The passenger assembly 916 includes a handlebar 932 adapted to be gripped by a passenger. With a grip on the handlebar 932 and with feet on the foot support assembly 912 a passenger may accomplish balance and stability and affect the dynamics of the transporter 900. The handlebar 932 is affixed to the inner rim 904 by connecting elements 940. The connecting elements 940 are shorter than the connecting elements 930 so that the radial distance of the operator handlebar 926 from the rotational axis 924 of the wheel is longer than the radial distance of the passenger handlebar 932 from the rotational axis 924. Connecting elements 940(*a*) and 940(*b*) form a forked structure attached at a base or stem 940(*c*) to the handlebar 932. The open ends of the fork formed by the connecting elements 940(*a*) and 940(*b*) are connected to opposite sides of the stationary inner rim 904 at locations 942(*a*) and 942(*b*), locations 942(*a*) and 942(*b*) being at approximately the 30° position along the inner rim 904. Connecting elements 940(*d*) and 940(*e*) form a forked structure attached at a base or stem 940(*f*) to the handlebar 932. The open ends of the fork formed by the connecting elements 940(*d*) and 940(*e*) are connected to opposite sides of the stationary inner rim 904 at locations 934(*a*) and 934(*b*), locations 934(*a*) and 934(*b*) being at approximately the 90° position along the inner rim 904. The open ends of the fork formed by connecting elements 940(*a*) and 940(*b*) and the open ends of the fork formed by connecting elements 940(*d*) and 940(*e*) are shaped to clear the tire 905 and the outer rim 906 and be affixed to the opposite sides of the inner rim 904 at, respectively, locations 942(*a*) and 942(*b*) and locations 934(*a*) and 934(*b*).

The operator assembly 914, the passenger assembly 916 and the inner rim 904 together form a rigid frame with which both the passenger and the operator interact. The inner rim 904 forms a hub around which the outer rim 906, with its associated tire 905, rotates. In use the outer rim 906 rotates about the fixed inner rim 904 as the operator advances the transporter 900 along the terrain. A passenger stands on the surface 922 of the standing platform 918 astraddle the wheel 902 with one foot on each side of the wheel while gripping the handlebar 932. The operator grips the handlebar 926 and ambulates forward. With forward movement the operator achieves balance and stability and guides the transporter along a chosen path. The passenger uses the handlebar 932 and the foot support assembly 912 to achieve passenger balance and stability and, by body motion, may affect overall balance and stability of the transporter 900.

The invention is described in connection with several configurations which are not intended to limit the scope of the invention. The invention is intended to include such alternatives and equivalents as are and may be defined by the following claims.

The invention claimed is:

1. A vehicle for a standing rider and an ambulatory operator comprising a surface engaging wheel, a pair of foot supports mounted one on each side of the wheel substantially coaxially with an axis of rotation of the wheel for supporting a passenger astride the wheel in a standing position centered substantially over the axis of rotation of the wheel facing forward, a frame having a fore riser and an aft riser operatively connected to the wheel and the foot supports, the fore riser so configured that a passenger standing on the foot supports is positioned aft of the fore riser for manually engaging the fore riser for stability and balance and the aft riser so configured that the passenger standing on the foot supports is positioned forward of the aft riser and an ambulatory operator rearward of the standing passenger may manually engage the aft riser to move the vehicle forward, stabilize and balance and steer the vehicle.

2. The vehicle according to claim 1 wherein the frame comprises an inner race, the aft riser affixed to the inner race for enabling an operator to push and guide the vehicle and the fore riser affixed to the inner race for enabling a rider to achieve stability and balance and wherein the surface engaging wheel comprises an outer race rotatable about the inner race.

3. The vehicle according to claim 2 wherein the aft riser extends rearward of the rotational axis of the wheel, the fore riser extends forward of the rotational axis of the wheel and the bilateral foot supports are affixed to the frame for locating the feet of the passenger on opposite sides of the wheel between the aft riser and the fore riser.

4. A single wheeled vehicle for transporting a standing passenger comprising:
(a) a frame;
(b) a single surface engaging wheel operatively mounted on the frame;
(c) a first riser and handle formed by the frame extending rearward of an axis of rotation of the wheel for enabling an ambulatory operator to engage the frame, advance the vehicle in a forward direction and enhance vehicular stability and balance;
(d) a second riser and handle formed by the frame extending forward of an upward from the axis of rotation of the wheel for manual engagement by a passenger in a standing position for enabling the passenger to effect passenger stability and balance and affect vehicular stability and balance; and
(e) a pair of foot supports mounted on the frame one on each side of the wheel along an axis substantially parallel to the rotational axis of wheel and centered substantially over the axis of the wheel closer to the axis of the wheel than to the rim of the wheel, forward of the first riser and handle and rearward of the second riser and handle, for supporting a passenger astride the wheel in a standing position facing forward between the risers with one foot on each side of the wheel and enabling the passenger to engage the second riser and handle to effect passenger stability and balance and affect vehicular stability and balance while being advanced in a forward direction by the operator.

5. A claim according to claim 4 further comprising shock absorbing means interposed between the wheel and the foot supports for cushioning the ride of the standing passenger supported by the foot supports.

6. A claim according to claim 4 wherein the pair of foot supports are mounted coaxially with the axis of rotation of the wheel.

7. A claim according to claim 4 wherein: (a) the first riser and handle comprises a riser extending rearward from a location substantially at the axis of rotation of the wheel for positioning an operator handle rearward of the axis of rotation of the wheel by which operator handle the operator may advance the vehicle forward; and (b) the second riser and handle comprises a riser extending forward from a location substantially at the axis of rotation of the wheel for situating a passenger handle forward of the axis of rotation of the wheel in a position to be grasped by the standing passenger to achieve stability and balance.

8. A vehicle for manually advancing a rider in a standing position comprising: a single wheel having a central hub; a frame mounted at the hub of the wheel forming a forward riser extending up and forward from a location at or near the hub of the wheel for manual engagement by the rider and a rearward riser extending up and rearward from a location at or near the hub of the wheel for enabling an ambulatory pusher to grasp the rearward riser for manually advancing the vehicle forward and providing vehicular stability and balance and a pair of foot supports mounted one on each side of the wheel centered substantially over an axis of the wheel between the forward riser and the rearward riser for supporting the riser in a standing position facing forward astride the wheel between the forward riser and the rearward riser in a position to manually grasp the forward riser for enhancing rider stability and balance.

9. The vehicle according to claim 8 wherein the forward riser comprises a bifurcated fork attached at the hub of the wheel and a rider handlebar situated a distance from the hub and aligned along an axis substantially parallel to the axis of the wheel.

10. The vehicle according to claim 9 wherein the rearward riser comprises a bifurcated fork attached at the hub of the wheel and a pusher handlebar situated a greater distance from the hub than the rider handlebar and aligned along an axis substantially parallel to the axis of the wheel.

11. The vehicle according to claim 10 wherein the width of the pusher handlebar is greater than the width of the rider handlebar.

12. The vehicle according to claim 8 wherein the foot supports are mounted coaxially with the axis of the wheel.

13. The vehicle according to claim 8 wherein the foot supports are mounted on opposite sides of the wheel displaced from the hub of the wheel along an axis substantially parallel to the axis of the hub and closer to the hub than to the rim of the wheel.

14. The vehicle according to claim 8 further comprising shock absorbing means interposed between the wheel and the frame for cushioning the ride of a rider standing on the foot supports.

15. A vehicle for advancing a standing rider forward comprising a single ground engaging wheel having a central hub, a frame mounted at the central hub having a pusher bar for an ambulatory operator and a rider bar for a rider standing astride the wheel facing forward, and a pair of foot supports mounted on the frame one on each side of the wheel along an axis substantially parallel to a rotary axis of wheel and centered substantially over the axis of the wheel closer to the rotary axis of the wheel than to the rim of the wheel, between the pusher bar and the rider bar, for supporting the standing rider astride the wheel between the pusher bar and the rider bar in a position to grasp the rider bar.

16. The vehicle according to claim 15 wherein the pusher bar is located a greater radial distance from the central hub than the rider bar.

17. The vehicle according to claim 16 wherein the length of the pusher bar is greater than the length of the rider bar.

18. The vehicle according to claim 15 wherein the pair of foot supports are mounted one on each side of the wheel coaxially with the central hub.

19. The vehicle according to claim 15 further comprising shock absorbing means interposed between the wheel and the frame for cushioning the ride of a rider standing on the foot supports.

20. A vehicle comprising:
(a) a frame;
(b) a single ground engaging wheel operatively mounted on the frame;
(c) a first riser on the frame extending upward and rearward of a rotational axis of the wheel for manual engagement by a person on foot;
(d) a second riser on the frame extending upward and forward of the rotational axis of the wheel for manual engagement by a rider in a standing position for enabling the standing rider to achieve balance and stability; and
(e) a pair of foot supports affixed to the frame between the first riser and the second riser centered substantially over the axis of the wheel for supporting the standing rider astride the wheel with the feet of the rider positioned one on each side of the wheel, in position to grasp the second riser while standing on the foot supports, the wheel and the frame including the first and second risers and the rider foot supports being arranged such that the person on foot may ambulate to transport the vehicle and the rider standing on the foot supports.

\* \* \* \* \*